United States Patent Office 3,764,293

Patented Oct. 9, 1973

3,764,293

LIQUID DROPLET SPRAYING METHOD AND COMPOSITION

Durward O. Guth, 332 S. Center St., Hillside, Ill. 60162

No Drawing. Filed July 1, 1970, Ser. No. 51,658
Int. Cl. A01n 9/24
U.S. Cl. 71—117 1 Claim

ABSTRACT OF THE DISCLOSURE

A new dispersing system for the production of liquid droplets of herbicides, fungicides or pesticides, having a particle diameter between 200 and 800 microns, preferably from 225 to 400 microns, the sole ingredient which creates the stable size of particle droplet being a polyhydric diol having from 2 to 6 carbon atoms.

This invention relates to agricultural spraying, particularly the spraying of fertilizers, fungicides, herbicides and pesticides. More particularly, the invention provides a new dispersing system for the production of liquid droplets, having a particle diameter between 200 and 800 microns, preferably from 225 to 400 microns, the sole ingredient which creates the stable size of particle droplet being a polyhydric diol having from 2 to 6 carbon atoms, selected from the group consisting of: 1,2-ethane diol; 1,2-propane diol; 1,2-butane diol; 1,3-propane diol; 1,3-butane diol; 1,4-butane diol; 1,2-pentane diol; 1,6-hexane diol; 2,3-hexane diol; 2-methyl-1,2-butane diol; 2-methyl-2,4-pentane diol; 3-methyl-1,2-butane diol; and other methyl isomers of butane diol and pentane diol.

The herbicide, fungicide or pesticide is suspended in a water solution or dispersion of 8–20% of organic diol with the pH of the aqueous mixture adjusted to provide a stable dispersion of the active agent. The effective diol dispersing agent may be mixed with from 0.01 to 0.5% of high viscosity petroleum oil in order to improve the dispersion of the herbicide or the like.

The longer chain diols, such as the hexane diols, are most effective and all of the diols can be used in admixture with C–6 to C–8 monohydric alcohols, such as hexanol and 2-ethyl hexanol, and with such polyhydric alcohols as sorbitol. Amounts up to 30% of the weight of the diol may be replaced with these alcohols.

In agricultural spraying, it is essential that the droplets issuing from the spray nozzles be of the proper size. This is especially important in aerial spraying. If the droplets are too large, there will be too much volume of spray falling per unit area of the target and, obviously, a volume of spray larger than necessary for best results is a waste of spray. If the droplets are too small, or if a portion of the spray is in the form of fine droplets, the droplets will not fall on the intended ground but will drift in the form of a cloud or aerosol. This is very undesirable, especially when spraying herbicides or similar materials which must land within certain boundaries of the target, otherwise it may damage adjacent crops. Fine droplets also tend to evaporate before they reach the target.

Thus, to get a uniform, fully effective spray, the droplets must be of uniform and correct size, with very small proportions of too large or too small droplets.

Reference is made to the paper by Houghton and Radford, entitled "On the Local Dissipation of Natural Fog," published October 1938 by the Massachusetts Institute of Technology under "Papers in Physical Oceanography and Meterorology," Woods Hole Oceanographic Institute, volume VI, No. 3. On pages 40 and 41 of this paper, it is stated that droplets of water having a particle size of 100–200 microns will settle, e.g., will fall from a height of 3–10 meters under a prevailing wind of 3–10 miles per hour.

These data, derived from sea fog measurements, show substantially no drift and emphasize the novelty of the present particle size range of at least 200 microns up to 800 microns with elimination of drift.

The prior art has attempted to obtain uniform droplets of the proper size by using thickening agents, invert emulsions and particulating agents in combination with the spray material. However, while the above methods eliminate the fine, aerosol droplets, they tend to increase the proportion of undue large droplets. Therefore, the above methods are economically inefficient and have a tendency to waste a portion of the spray.

An object of this invention is to provide a method for treating agricultural spray material so that the material forms a spray of uniform, correctly sized droplets which will cover the target area within the desired boundaries with an even spray of the desired density, and thus eliminate fine and coarse droplets and their objectionable behavior.

Another object is to provide an agricultural spray including ingredients which will form a spray having a minimum proportion of fine droplets of aerosol size and at the same time preventing formation of coarse droplets.

A further object is to provide an agricultural spray material which may be used with any type of presently available spraying apparatus. The material issues as a spray comprising uniform and correctly sized discrete droplets determined by the initial settings of the spray nozzles, and will retain the correct size of the droplets and the spray pattern, as initially set, throughout the entire spray operation.

EXAMPLE I

| Ingredient: | Grams |
|---|---|
| 2,4-dichlorophenoxyacetic acid | 482 |
| Ethylenediaminetetraacetic acid | 10 |
| Lithium hydroxide monohydrate | 97 |
| Distilled water | 3163 |
| 2,3-hexanediol | 454 |

The above ingredients, when mixed together and reacted to a pH of approximately 9.6, produced 4 liters of an aqueous solution of lithium 2,4-dichlorophenoxyacetate of a strength which is commonly referred to in the herbicide industry as 1 pound chemical acid equivalent 2,4-D per gallon.

One gallon of this solution was then diluted with sufficient water to produce 12 gallons of spray solution. This solution was then applied, using a conventional herbicide nozzle, such as that of the Spraying Systems Company, 8002, using 25 p.s.i. pressure. Using a 20" spray nozzle spacing on the spray boom and with the application equipment traveling at 4 miles per hour, this quantity of spray solution covered approximately 1 acre. Almost no spray droplets smaller than 200 microns were produced. For many uses, 200 microns is considered to be the dividing line between the size of droplets that cause spray drift problems and those that do not.

EXAMPLE II

This example shows the addition of petroleum oil to the ingredients of Example I, as follows:

| Ingredient: | Grams |
|---|---|
| 2,4-dichlorophenoxyacetic acid | 482 |
| Ethylenediaminetetraacetic acid | 10 |
| Lithium hydroxide monohydrate | 97 |
| Distilled water | 3163 |
| 2,3-hexanediol | 454 |
| Petroleum oil of 100" at 100° F. viscosity | 0.02 |

The petroleum oil was dissolved in the 2,3-hexanediol and the steps of Example I were followed. The results were comparable to those of Example I.

EXAMPLE III

| Ingredient: | Grams |
| --- | --- |
| 2,4-dichlorophenoxyacetic acid | 482 |
| Ethylenediaminetetraacetic acid | 10 |
| Lithium hydroxide monohydrate | 97 |
| Distilled water | 3163 |
| 2,3-hexanediol | 400 |
| 2-ethyl hexanol | 50 |

EXAMPLE IV

| Ingredient: | Grams |
| --- | --- |
| 2,4-dichlorophenoxyacetic acid | 482 |
| Ethylenediaminetetraacetic acid | 10 |
| Lithium hydroxide monohydrate | 97 |
| Distilled water | 3163 |
| 2-methyl-2,4-pentanediol | 450 |

The new dispersing system of the present invention is uniquely adapted for aerial application and commercial spray equipment, available for use on helicopters and other similar aircraft used in accurately placing the pesticide under conditions avoiding damage by drift.

An example of this equipment is the Microfoil Boom as described in Agrichemical West, December 1968, pp. 16 and 18, available in a length of from 10–26 feet to provide an herbicide path of 10–70 feet. The orifices, 13 and 15 mils inner diameter, are designed to produce droplets up to about 800 microns. The pressure and flow of liquid dispersion within the boom tubing and nozzles is such as to produce a number of droplets without any rotational or helical movement of the liquid. Relatively low pressure, on the order of two pounds p.s.i., is maintained on each needle orifice and at low aircraft speeds, precise coverage of herbicide can be effected within the amounts recommended, e.g., from 2–12 gallons volume per acre. The use of the present dispersions permits much better coverage than with the invert emulsions because of the uniformity of the droplets and drift is substantially eliminated. This is of great importance in controlling weeds along drainage ditches and canals and along utility, pipeline, railroad and highway rights of way alongside public picnic areas.

The elimination of drift and the precise herbicide dosage afforded by the dispersing system of the invention are distinct advantages.

The spray material incorporating any of the above-disclosed chemical compositions may be used with any commercially available spraying apparatus. For example, if the material is to be sprayed aerially, the type of sprayer apparatus manufactured by Amchem Products, Inc., Ambler, Pa. may be used. Briefly, the sprayer comprises a boom carrying the required number of nozzles, each shaped like an airplane wing and incorporating a large number of hypodermic-like needle jets protruding from the trailing edge. The small nozzles discharge under low pressure and tend to decrease the proportion of the objectionable fine droplets. Using such spray apparatus for spraying the herein disclosed novel spray radically reduces the aerosol effect. However, the novel spray material may be dispersed aerially by other commercially available aerial types of spraying apparatus.

For ground spraying, conventional apparatus may be used. The conventional ground sprayer usually comprises a pipe of desired length supported on a vehicle. The pipe carries a number of nozzle mounting holes. The nozzles are selected in accordance with the kind of spray to be dispersed. Thus, fertilizer sprays require a different type nozzle than, for example, herbicide sprays. After the selected nozzles are inserted in the mountings, they are adjusted to give the required density and pattern of spray. The vehicle also carries the container for the spray material, the pump and the various controls thereof. The pump pressure is adjusted to cooperate with the nozzle settings to give the desired density and pattern of spray. The spray material is compounded with the desired additives selected from the above-disclosed compositions. In view of the additive, the spray issuing from the set nozzle is composed of uniform, correctly sized droplets, with too fine or too coarse droplets eliminated. The spray will thereby cover the target with a uniform density without any aerosol drift formation. With no formation of fine droplets, spraying may be done regardless of wind conditions, since no spray drifting conditions are formed with the herein disclosed compositions incorporated in the spray.

Pesticides which can be used in the dispersing system of the present invention include chlorinated hydrocarbons, such as chlordane, 1-amino benzothiazole, sulfur compounds, such as ferric dimethyl dithiocarbamate (Fermate), tetramethyl thiuranedisulfide, disodium ethylene bis-dithiocarbamate (Dithane), zinc dithiocarbamate, and phosphates such as hexaethylphosphate and parathion.

I claim:

1. In a method of spraying under low pressure of about 2 up to 25 pounds per square inch through orifices of about 13 to 15 mils inner diameter for applying an effective amount of a herbicide, fungicide or pesticide, the improvement consisting of providing an aqueous dispersion for the production of large liquid droplets of herbicides, fungicides and pesticides of uniform size of 200 and 800 microns without substantial drift, said dispersion consisting essentially of a polyhydric diol having from 2 to 6 carbon atoms in a concentration of from 8 to 20% as the sole dispersing agent in water, said diol being selected from the group consisting of 1,2-ethane diol; 1,2-propane diol; 1,2-butane diol; 1,3-propane diol; 1,3-butane diol; 1,4-butane diol; 1,2-pentane diol; 1,6-hexane diol; 2,3-hexane diol; 2-methyl-1,2-butane diol; 2-methyl-2,4-pentane diol; and 3-methyl-1,2-butane diol; together with an effective amount of a 2,4-dichlorophenoxy acetic acid-type herbicide and pesticide selected from the group consisting of chlordane, amino benzothiazole, ferric dimethyl dithiocarbamate, tetramethyl thiuranedisulfide, zinc dithiocarbamate, ethylene bis-dithiocarbamate, parathion and hexaethylphosphate and up to about 0.5% of a high viscosity petroleum oil to aid in the dispersion of the effective herbicide, fungicide or pesticide.

References Cited

UNITED STATES PATENTS

| | | | |
| --- | --- | --- | --- |
| 2,510,839 | 6/1950 | Shmidl | 71—117 |
| 2,606,876 | 8/1952 | Kamlet et al. | 71—117 |
| 2,558,762 | 7/1951 | Kohn, Jr. et al. | 71—DIG. 1 |
| 3,399,991 | 9/1968 | Littler | 71—120 |

FOREIGN PATENTS

| | | | |
| --- | --- | --- | --- |
| 815,510 | 6/1959 | Great Britain | 71—DIG. 1 |

JAMES O. THOMAS, JR., Primary Examiner

U.S. Cl. X.R.

71—DIG. 1; 424—43